United States Patent [19]

Janson et al.

[11] Patent Number: 4,988,060
[45] Date of Patent: Jan. 29, 1991

[54] SOLAR COLLECTOR PANEL ARRANGEMENT WITH PARTLY AND FULLY FOLDABLE PANELS

[75] Inventors: Juergen Janson, Ottobrunn; Otto-Heinz Gruber, Baldham; Roland Cosaert, Munich, all of Fed. Rep. of Germany

[73] Assignee: Messerschmitt-Boelkow-Blohm GmbH, Munich, Fed. Rep. of Germany

[21] Appl. No.: 489,286

[22] Filed: Mar. 5, 1990

[30] Foreign Application Priority Data

Mar. 4, 1989 [DE] Fed. Rep. of Germany ....... 3907063

[51] Int. Cl.$^5$ .................................. B64G 1/44
[52] U.S. Cl. .................................. 244/173; 136/245; 136/292
[58] Field of Search ............... 244/158, 164, 173; 136/245, 292

[56] References Cited

U.S. PATENT DOCUMENTS 437,113  2/1883  Marello et al. .................. 244/173
4,747,566  5/1988  Kiendl .

FOREIGN PATENT DOCUMENTS 0120662  10/1984  European Pat. Off. .
2604005   8/1977  Fed. Rep. of Germany .
3615264  11/1987  Fed. Rep. of Germany .

Primary Examiner—Joseph F. Peters, Jr.
Assistant Examiner—Virna Lissi Mojica
Attorney, Agent, or Firm—W. G. Fasse

[57] ABSTRACT

A solar collector panel arrangement includes a plurality of panels interconnected to form panel wings which in turn are secured in a symmetric fashion to a spacecraft, especially a satellite. At least the axially outermost panels forming the tip of a panel wing, are partially and/or fully foldable while the other panels of the wing are fully unfoldable. In the fully unfolded state of a wing all panels are located in a common plane in which also the system central axis is located. The two solar generator wings are so folded and structured or arrestable in certain positions that the entire center of gravity in the partially unfolded state remains in the same position as in the fully unfolded state and in the fully folded state.

11 Claims, 4 Drawing Sheets

SOLAR COLLECTOR PANEL ARRANGEMENT WITH PARTLY AND FULLY FOLDABLE PANELS

FIELD OF THE INVENTION

The invention relates to a solar collector panel arrangement with partly and fully foldable panels, especially for use in spacecraft, whereby the panels are interconnected by hinges to form panel wings.

BACKGROUND INFORMATION

Solar collector panel arrangements of the type just mentioned are, for example, described in German Patent Publication No. 3,615,264. Dividing the solar cell surface into two symmetrically arranged solar generator wings has proven itself in practical terms in the past and is used frequently. Comparing the fully folded state of the solar generator wings on the one hand with the fully unfolded state of the wings on the other hand, it is noted that the center of gravity of the solar generator and thus of the spacecraft such as a satellite, is substantially unchanged in both circumstances. The kinematic elements for the folding and unfolding, including the enforced control of the folding and unfolding, are known, for example, as a CCL.

In certain flight phases it may be sufficient to supply the spacecraft with a reduced solar power. For this purpose it is customary that only one wing is unfolded or that only a few outer panels near the panel wing tips of both solar generator wings are partially unfolded. Such a state of operation is shown, for example, in FIG. 1 of the above mentioned German Patent Publication (DE-OS) No. 3,615,264. It is clear that the one-sided position of a partially unfolded panel leads to a noticeable displacement of the center of gravity of the solar generator and thus of the satellite. The satellites have, as a rule, a rocket drive, also referred to as apogee motor or engine, for the purpose of reaching the intended orbit after separation from the last rocket stage. The axis of the apogee motor extends normally through the center of gravity of the spacecraft or satellite, whereby the center of gravity is determined or given by the folded or fully unfolded condition of the solar generator wings. If the apogee motor is switched on for an acceleration while the solar generator wings are partially unfolded, a torque moment is generated due to the mentioned displacement of the center of gravity. Such torque moment may, for example, be a yawing moment about the axis of the solar generator. Such a moment must be sensed by the position control system of the spacecraft so that it can be compensated. The compensation may, for example, be accomplished by tilting the apogee motor, by switching-on auxiliary engines, by causing a mass displacement, or by producing other counter moments, for example, with the aid of a gyro. However, all these measures increase the requirements that must be met by the position closed loop control system. As a result, such a system becomes more complicated, more expensive, and heavier. The more complicated system is also subject to a larger probability of failure. Incidentally, the above German Patent Publication corresponds to U.S. Pat. No. 4,747,566 (Kiendl).

OBJECTS OF THE INVENTION

In view of the above it is the aim of the invention to achieve the following objects singly or in combination:

to avoid the drawbacks of the prior art, more specifically, to arrange the panels forming the solar collector wings in such a way that their unfolding, especially the partial unfolding substantially avoids any center of gravity displacements, so that the closed loop position control system may be simplified;

to maintain the total or overall center of gravity of the spacecraft, including that of the solar generator wings substantially unchanged in all three positions of the solar generator wings, namely the fully folded or stored position, the partially unfolded condition, and the fully unfolded position;

to make sure that the mounting elements of the panels have a minimal influence on the location of the center of gravity even if these mounting elements have a nonsymmetrical position in the fully folded state; and to arrange the panels of a wing in such a way that for a partially unfolded wing the total or overall center of gravity remains on a central axis of the spacecraft.

SUMMARY OF THE INVENTION

According to a first embodiment of the invention, the solar generator wings or rather the panels of these wings are hinged to one another in such a manner that the panels can be folded in opposite directions and so that the partially unfolded panels of one wing extend in parallel and displaced relative to the partially unfolded panels of the other wing, whereby the panel planes are displaced or spaced from each other by a panel length. In this type of arrangement the total or overall center of gravity of the satellite or spacecraft with its solar generator wings remains unchanged when the panels are partially unfolded as compared to the fully folded or stored condition, or as compared to the fully unfolded condition. The center of gravity always remains in the same position According to another embodiment of the invention the partially unfoldable panels at the outer tip of the panel wing is hinged to the neighboring fully unfoldable panel by two parallel hinging axes, rather than being hinged directly by a single axis. This type of hinging of the partially foldable outer panels of the inner edge of the partially unfolded outer panel, to a center line of the neighboring panel, which is only completely unfoldable, keeps the partially unfolded outer panel or panels in a plane through which the longitudinal central system axis of the entire solar generator wing extends. The mass of the mounting hinging means is relatively small compared to the mass of the panels so that even when the panels are in the fully folded nonsymmetric condition, there is practically no displacement of the overall or total center of gravity.

According to a third embodiment of the invention the fully unfoldable panel radially inwardly next to the partially unfoldable outer panel assumes a slanted position relative to a central axis so that the total or overall center of gravity of the mass system of the two panels, namely the slanted panel and the partially unfolded panel, remains located on the longitudinal central axis of the solar generated wing.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
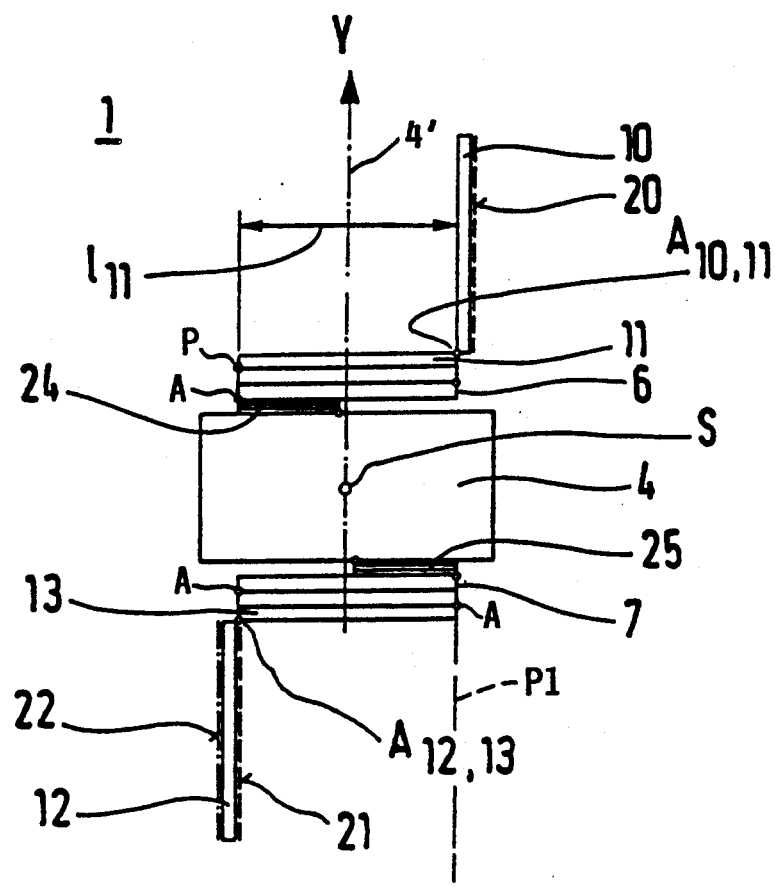
FIG. 1 is a schematic plan view in the direction of the hinging axes extending perpendicularly to the plane of the drawing of a spacecraft with partially unfolded solar generator wings.

The arrangement of FIG. 1 comprises a spacecraft 4 having a longitudinal system axis 4' which is assumed to be oriented in the Y-direction. The spacecraft 4 has a center of gravity S. The spacecraft 4 carries two sets of solar collector panels. The first set with panels 10 and 11 forms a first solar generator wing 6. The second set with panels 12 and 13 forms a second solar generator wing 7. The axially outermost panels 10 and 12 are shown in their unfolded condition while the plurality of panels 11 and the plurality of panels 13 are shown in the still folded condition, or stacked condition.

All panels are hinged to each other in a wing by hinging means A. Each hinging means A of conventional construction has a hinging axis extending perpendicularly to the plane of the drawing. The hinging axis between the axially outermost unfolded solar panel 10 and the neighboring axially next folded panel 11 is shown at A, 10, 11. The hinging axis between the unfolded panel 12 and the axially inward neighboring panel 13 is shown at A, 12, 13. The wing 6 is mounted to the spacecraft 4 by a mounting mechanism 24 also having hinging axes extending in parallel to all the other hinging axes. The panel wing 7 is mounted to the spacecraft 4 by a mounting mechanism 25 having a respective hinging axis in parallel to the other hinging axis. The mounting mechanism 24 is located diagonally opposite the mounting mechanism 25. Similarly, the unfolded panel 10 is located diagonally opposite the unfolded panel 12, whereby the symmetry required for keeping the center of gravity relatively stationary within the spacecraft 4 is assured even when only two panels are unfolded as shown at 10 and 12.

When all the panels are unfolded, they will extend approximately in a common plane coinciding with the Y-axis. If the spacecraft 4 should, for example, be a geostationary satellite, it is advantageous that the solar panel wings 6 and 7 could rotate about the axis 4' so that the wings can track or follow the sun for optimizing the energy collected in the course of a day. It is an advantage of the invention that the just described system, including the spacecraft 4 and the solar collector panel wings 6 and 7, maintains the center of gravity S in the same position, not only when the panels are fully folded, but also when the panels are fully unfolded and, most important, when the panels are only partially unfolded, as shown in FIG. 1. This advantage of the invention is important because it substantially simplifies the closed loop position control of the system when accelerations or decelerations must be applied to the spacecraft. The just described feature is assured by the fact that the axis $A_{10, 11}$ is diagonally opposite the axis $A_{12, 13}$ and similarly, the mounting mechanism 24 is located diagonally opposite the mounting mechanism 25 as described. In such an arrangement, the dimensions of the individual panels, especially their length $l_{11}$ is so selected that a line connecting, for example, the center of gravity of the panel 10 in its unfolded state with the center of gravity of the panel 12 in its unfolded state still passes through the main center of gravity S. Similarly, a line connecting the hinging axes $A_{10, 11}$ with the hinging axes $A_{12, 13}$, also passes through the center of gravity S. When all the panels are folded, the line connecting the individual gravity centers also passes through the main gravity center S. Further, the plane defined by the panel 10 in its unfolded state extends in parallel to the plane defined by the panel 12 in its unfolded state. Further, the spacing between the just mentioned planes corresponds to $l_{11}$, the length of all the panels.

The solar collector cells 20 on the panel 10 face in the same direction as the solar cells 21 on the panel 12. However, the panel 12 also has solar cells 22 on its backside, so to speak, and these cells 22 face in an opposite direction.

Figure 2:
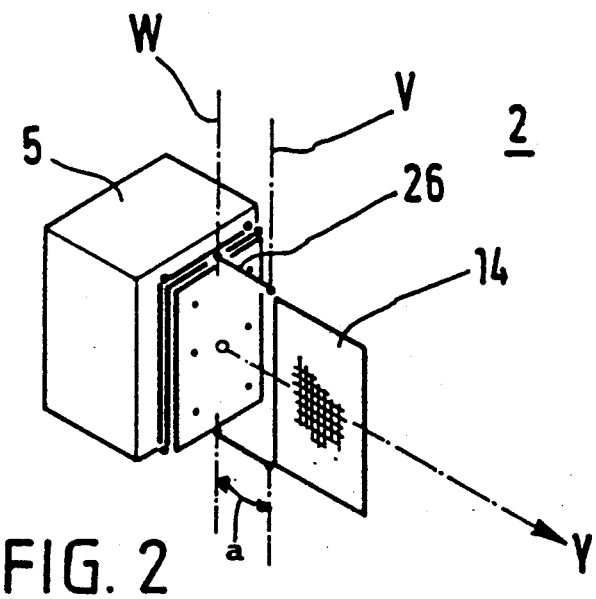
FIG. 2 illustrates a perspective view of a second embodiment in which the solar panel wings are partially unfolded, and wherein two parallel hinging axes are employed for securing the outer tip panel to the next inward panel.
Figure 3:
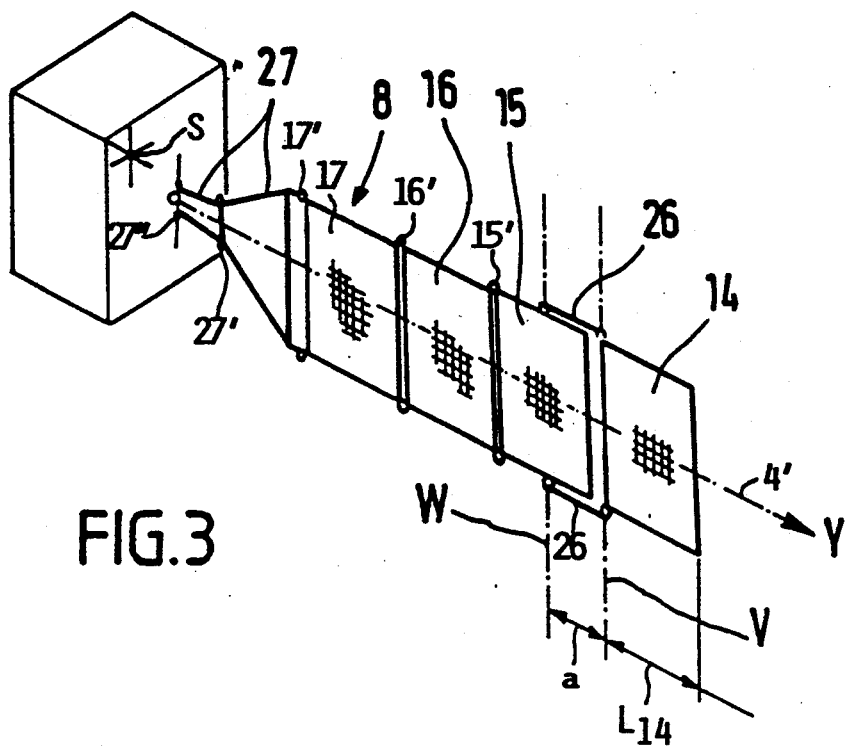
FIG. 3 is a perspective view similar to that of FIG. 2, however, showing the second embodiment with a fully unfolded solar generator wing.

The system illustrated in FIG. 1 is not limited to partially unfolding merely one panel in each wing. For example, it is possible to partially unfold the panels 10 and 11 of the wing 6, and the panels 12 and 13 of the wing 7. In that case, the panels 10 and 11 would be located in plane P while panels 12 and 13 would be located in plane P1. The above mentioned diagonal connecting lines would still pass through the main center of gravity S which is thus maintained substantially unchanged in its original position. When all the panels are unfolded, they would extend in a plane substantially coinciding with a system axis 4'. In FIG. 1 neighboring panels fold in opposite directions FIGS. 2 and 3 show a second embodiment of the invention, whereby the perspective illustration shows only one panel wing 16 while the other panel wing which is arranged mirror-symmetrically on the other side of the spacecraft 5 is not shown for simplicity's sake. The construction of both wings is identical. FIG. 2 shows the partially unfolded state while FIG. 3 shows the fully unfolded wing 8. In both instances, the center of gravity S of the entire system remains in its original position. In this second embodiment 2 the panel 14 axially at the outer tip of the wing 8 is secured to its neighboring panel 15 by pivoting mounting brackets 26 defining two hinging axes V and W. These hinging axes V and W are spaced from each other by a spacing a corresponding approximately to one half of the panel length $L_{14}$ as measured in the Y-direction. Preferably, all panels 14, 15, 16, and so forth have the same axial length $L_{14}$.

The hinging axes V extends along an axially inner edge of the outermost tip panel 14. The hinging axis W extends through the center of the panel 15 which, to be effective, must be fully unfolded. The panels 15 and 16 are hinged to each other along their edges at 15'. The panel 16 is hinged at 16' to the panel 17. The panel 17 is hinged at 17' to a mounting mechanism 27. The mounting mechanism 27 has a hinging axis 27' and a further hinging axis 27" connecting the mounting mechanism 27 to the spacecraft 5. The axial spacing between the hinging axis 17' and the hinging axis 27' corresponds to the axial length $L_{14}$. The axial spacing between the hinging axis 27' and 27" corresponds to the spacing a. Thus, the mounting mechanism 27 can be folded onto itself, so to speak. Spacing $a \frac{1}{2} =$ of $L_{14}$.

FIGS. 2 and 3 show that the axially outer panel 14 always extends in the plane passing through the Y-direction when the wing 8 is partially unfolded as shown in FIG. 2, and when the wing 8 is fully unfolded as shown in FIG. 3. The above described dimensions make sure that the individual center of gravity of the panel stack 8' including the mounting mechanism, is also located on the axis in the Y-direction. As a result, the overall center of gravity S is not shifted and it remains in the same position in FIGS. 2 and 3. However, in the fully folded condition, the mounting brackets 26 introduce a certain nonsymmetry which actually is negligible with regard to its influence on the position of the center of gravity S, because the mass of the brackets 26 is small relative to the mass of the panels. Additionally, the influence of the brackets 26 can be further reduced by arranging the brackets of the two wings in such a way, that in the fully folded condition of the system the brackets of one wing extend in one direction away from the system axis 4' while the brackets 26 of the other wing extends away from the axis 4' in the opposite direction. The same has been shown for the mounting mechanisms 24 and 25 in FIG. 1.

Figure 4:
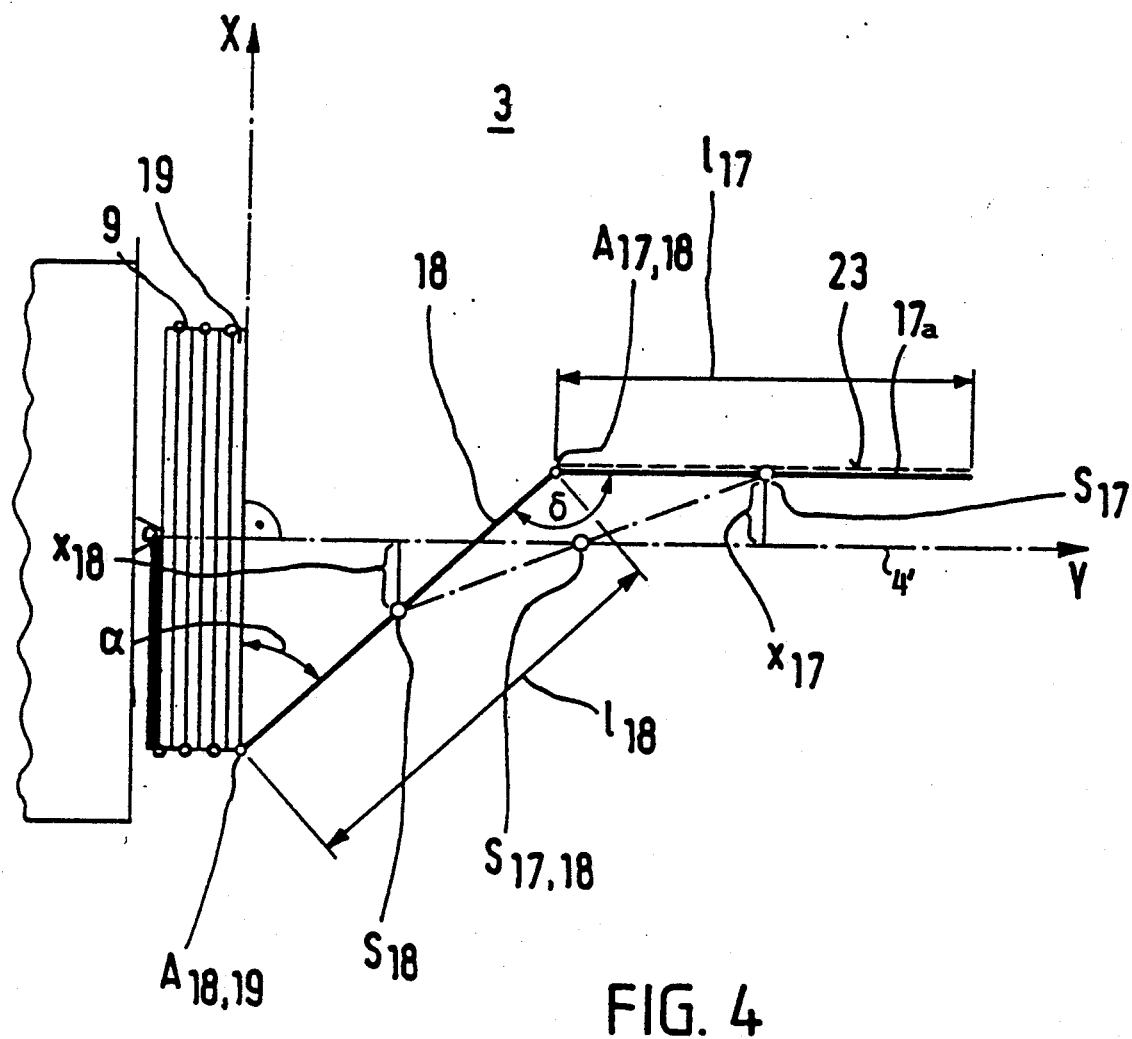
FIG. 4 illustrates schematically a third embodiment of the invention in which the tip panel extends partially unfolded in parallel to a central system axis while the next inner fully unfoldable panel extends at a slant relative to the central system axis.

FIG. 4 illustrates a third embodiment according to the invention, whereby only one solar generator panel wing 9 is illustrated. The other wing and the spacecraft itself are not shown. The wing 9 comprises an axially outer partially unfoldable collector panel 17a and a plurality of only fully unfoldable panels 18, 19 and so forth. The outermost panel 17a is only partially unfoldable. The panel 17a is connected to the group of fully unfoldable panels 19 by an intermediate panel 18 which is either partially unfoldable as shown in FIG. 4, or it is fully unfoldable. For this purpose, the panels 17a and 18 are hinged to each other at a hinging axis $A_{17,18}$ and the panel 18 is hinged to the outermost panel of the still folded group of panels 19 at the hinging axis $A_{18,19}$. In the position shown in FIG. 4, the intermediate panel 18 is arrestable in the shown slanted position at an angle $\alpha$ between the panel 18 and the panel 19. The panel 19, or rather, the group of still folded panels 19, extend at a right angle to the system axis 4'. The partially unfolded panel 17a extends in parallel to the Y-direction and thus in parallel to the system axis 4' so that the panel 17a in its partially unfolded state extends also at a right angle to the panel 19. Thus, the angle $\delta$ between the panels 17a and 18 corresponds to $\delta = 90° + \alpha$.

Assuming that the center of gravity of the still stacked or fully folded panels 19 is located on the Y-axis, the angle $\alpha$ is so selected that the center of gravity $S_{17, 18}$ of the mass system comprising the panels 17a and 18 is also located on the system axis 4'.

The following assumptions shall be applicable for the following calculations. The centers of gravity $S_{17}$ of the panel 17a and $S_{18}$ of the panel 18 shall be located in the center of the panel length $l_{17}$ and $l_{18}$ respectively. The tilting axes $A_{17,18}$ and $A_{18,19}$ are located centrally in the longitudinal central axis of the respective panels 17a and 18. The thickness of the panels 17a and 18 is so small that it is negligible compared to the length $l_{17}$ and $l_{18}$.

Further, $m_{17}$ is the mass of the panel 17a including its hinges. $m_{18}$ is the mass of the panel 18, including its hinges. $x_{17}$ is the spacing of the center of gravity $S_{17}$ of the panel 17a from the system axis 4' extending in the Y-direction.

$x_{18}$ is the spacing of the center of gravity $S_{18}$ of the panel 18 from the system axis 4'. The X-axis shown in FIG. 4 extends perpendicularly to the Y-direction and thus perpendicularly to the system axis 4'. The total center of gravity $S_{17,18}$ of the panels 17a and 18 is located precisely on the system axis 4' if the following condition is satisfied:

$$m_{17} \cdot x_{17} = m_{18} \cdot x_{18}$$

The still stacked panels 19 also shall have all the same length $l_{18}$ which is abbreviated in the following equations simply as l:

$$x_{17} = \frac{l}{2}(2 \cos \alpha - 1)$$

$$x_{18} = \frac{l}{2}(1 - \cos \alpha).$$

By inserting these equations into the above given moment equilibrium condition, and by simplifying the equations, we obtain:

$$\cos \alpha = \frac{1 + \frac{m_{17}}{m_{18}}}{1 + \left(2 \cdot \frac{m_{17}}{m_{18}}\right)}.$$

Assuming that the panels 17a and 18 have the same mass $m_{17} = m_{18}$, we obtain:
  $\cos \alpha = \frac{2}{3}$;
  $\alpha = 48,19°$;
  $\delta = 138,19°$.

If, for example, two panels are unfolded, it is possible to combine the mass of the two panels for the purposes of calculation, whereby $m_{17}$ becomes twice as large as $m_{18}$. ($m_{17} = 2 \cdot m_{18}$). In which case we obtain for $\alpha$ and $\delta$:
  $\cos \alpha = 3/5$;
  $\alpha = 53,13°$;
  $\delta 143,13°$.

Figure 5:
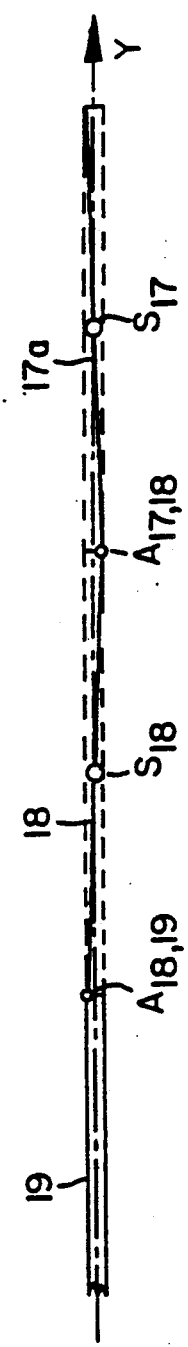
FIG. 5 illustrates the fully unfolded state of the embodiment of FIG. 4.

Actual embodiments of this type of construction must take into account that the panels have a certain thickness and that they can be stacked flat one against the other. Stated differently, the hinging axis will have to be located along a corner of the respective panel rather than in its center plane, unless special hinge structures are used. When the hinges are located along a panel edge, there will be certain deviations from the above shown calculation of the angles. However, such deviations are negligibly small for actual panels thicknesses. FIG. 5 shows the fully unfolded state of the embodiment of FIG. 4. Although the invention has been described with reference to specific example embodiments it will be appreciated that it is intended to cover all modifications and equivalents within the scope of the appended claims.

What we claim is:

1. A solar collector panel system for a spacecraft having a central system axis, comprising a first panel wing connected to one side of said spacecraft, a second panel wing connected to an opposite side of said spacecraft, each panel wing comprising a wing tip outer panel remote from said spacecraft and a number of intermediate panels between said spacecraft and said outer panel, first mounting hinging means (24, 25) for mounting each panel wing to said spacecraft, second hinging means (A) for securing said intermediate panels to each other so that said intermediate panels are foldable alternately in opposite directions, whereby said intermediate panels extend perpendicularly to said central axis (4') when said intermediate panels are fully folded and substantially along said central axis when said intermediate panels are fully unfolded, and third hinging means ($A_{10,11}$; $A_{12,13}$) for securing each outer panel to its neighboring intermediate panel, so that said outer panels in their partly unfolded state extend in parallel planes (P, P1) on opposite sides of said central axis, whereby a center of gravity (S) of said system remains substantially in the same position in all states of said system.

2. The solar collector panel system of claim 1, wherein said outer panels (10, 12) in their partly unfolded state extend diagonally opposite each other on opposite sides of said spacecraft.

3. The solar collector panel system of claim 1, wherein said parallel planes (P, P1) are spaced from each other perpendicularly to said central axis by a spacing ($1_{11}$) corresponding approximately to an axial panel length ($1_{11}$).

4. The solar collector panel system of claim 1, wherein said panels carry solar cells (20, 21) facing in the same direction when said panels are partly unfolded.

5. The solar collector panel system of claim 1, wherein said panels carry solar cells (20, 22) which face in opposite directions when said panels are partly unfolded.

6. A solar collector panel system for a spacecraft having a central system axis, comprising a first panel wing connected to one side of said spacecraft, a second panel wing connected to an opposite side of said spacecraft, each panel wing comprising a wing tip outer panel remote from said spacecraft and a number of intermediate panels between said spacecraft and said outer panel, first mounting hinging means for mounting each panel wing to said spacecraft, said first mounting means comprising a mounting mechanism (27) with three parallel hinging axes (17', 27', 27''), second hinging means (15', 16') for interconnecting neighboring intermediate panels (15, 16, 17) to each other along their edges, and third hinging means (26) comprising two hinging brackets for securing said outer panel (14) to its respective neighboring intermediate panel, said hinging brackets forming a first hinging axis (V) extending along an axially inwardly facing edge of said outer panel (14) and a second hinging axis (W) extending centrally in a plane defined by an intermediate panel (15) next to said outer panel (14), so that said first and second hinging axes (V, W) extend in parallel to each other, whereby a panel wing is partly unfoldable, although all panels are only fully unfoldable when the center of gravity remains substantially in the same position in all states of said system.

7. The solar collector panel system of claim 6, wherein said panels have a panel length ($L_{14}$) and said first and second hinging axes (V, W) are spaced from each other by a spacing (a) corresponding to about one half of said panel length ($L_{14}$).

8. The solar collector panel system of claim 6, wherein said mounting mechanism (27) comprises first and second arms interconnected at one of said hinging axes (27'), said first arm being hinged centrally to said spacecraft at another of said axes (27''), said second arm being hinged to its neighboring intermediate panel (17) at a third hinging axis (17').

9. The solar collector panel system of claim 8, wherein said panels have an axial panel length ($L_{14}$), said first arm of said mounting mechanism having an axial length corresponding to about one half of said axial panel length, said second arm having an axial length corresponding to about said axial panel length.

10. A solar collector panel system for a spacecraft having a central system axis, comprising a first panel wing connected to one side of said spacecraft, a second panel wing connected to an opposite side of said spacecraft, each panel wing comprising at least one partly unfoldable wing tip outer panel remote from said spacecraft and a number of intermediate panels between said spacecraft and said outer panel, first mounting hinging means for mounting each panel wing to said spacecraft, wherein said intermediate panels comprise a slantable panel (18) hinged at ($A_{17,18}$) to an inner edge of an axially innermost outer panel of said outer panels (17a), said slantable panel (18) being arrestable in a slanted position at a first angle ($\alpha$) relative to its neighboring intermediate panel (19) that is not yet unfolded, said outer panel (17a) extending at a second angle ($\delta$) to said slanted panel in its fixed slanted position, and wherein said first and second angles ($\alpha$, $\delta$) are so selected that a center of gravity ($S_{17,18}$) of said slanted panel (18) and of said outer panel (17a) is located on said system axis (4'), whereby an overall system center of gravity remains substantially in the same position for all states of the system.

11. The solar collector panel system of claim 10, wherein said outer panel (17a) extends in parallel to said central system axis and perpendicularly to intermediate panels still in their folded state.

* * * * *

UNITED STATES PATENT AND TRADEMARK OFFICE
CERTIFICATE OF CORRECTION

PATENT NO. : 4,988,060

DATED : January 29, 1991

INVENTOR(S) : Juergen Janson et al.

It is certified that error appears in the above-identified patent and that said Letters Patent is hereby corrected as shown below:

Column 6, line 32, replace "$\alpha = 48,19°;$" by --$\alpha = 48.19°;$--;

Column 6, line 33, replace "$\delta = 138,19°.$" by -- $\delta = 138.19°.$--;

Column 6, line 39, replace "$\alpha = 53,13°;$" by --$\alpha = 53.13°;$--;

Column 6, line 40, replace "$\delta\ 143,13°.$" by --$\delta = 143.13°.$--.

Signed and Sealed this

Sixteenth Day of June, 1992

Attest:

DOUGLAS B. COMER

Attesting Officer

Acting Commissioner of Patents and Trademarks